United States Patent
Chiussi et al.

(10) Patent No.: US 8,693,987 B2
(45) Date of Patent: Apr. 8, 2014

(54) FEMTO PERSONAL POLICY SERVER

(75) Inventors: Fabio M. Chiussi, Long Branch, NJ (US); Parameshwar Hegde, Billerica, MA (US); Oleg Volinsky, Acton, MA (US)

(73) Assignee: Airvana LP, Chelmsford, MA (US)

( * ) Notice: Subject to any disclaimer, the term of this patent is extended or adjusted under 35 U.S.C. 154(b) by 754 days.

(21) Appl. No.: 12/347,234

(22) Filed: Dec. 31, 2008

(65) Prior Publication Data

US 2010/0167694 A1 Jul. 1, 2010

(51) Int. Cl.
*H04M 1/66* (2006.01)

(52) U.S. Cl.
USPC .......... 455/411; 455/26.1; 455/444; 455/420; 455/414.1; 455/432.1; 370/338

(58) Field of Classification Search
USPC .......... 455/304, 410, 411, 435.1–435.3, 403, 455/414.1–417, 422.1, 432.1–435.3, 443, 455/444, 63.2, 432.1–434; 370/395.2, 370/395.21, 395.3, 338; 713/155, 168–176
See application file for complete search history.

(56) References Cited

U.S. PATENT DOCUMENTS

| | | | |
|---|---|---|---|
| 6,711,144 B1 | 3/2004 | Kim et al. | |
| 6,731,618 B1 | 5/2004 | Chung et al. | |
| 6,741,862 B2 | 5/2004 | Chung et al. | |
| 6,781,999 B2 | 8/2004 | Eyuboglu et al. | |
| 6,941,148 B2 | 9/2005 | Hansmann et al. | |
| 7,170,871 B2 | 1/2007 | Eyuboglu et al. | |
| 7,200,391 B2 | 4/2007 | Chung et al. | |
| 7,242,958 B2 | 7/2007 | Chung et al. | |
| 7,277,446 B1 | 10/2007 | Abi-Nassif et al. | |
| 7,299,278 B2 | 11/2007 | Ch'ng | |
| 7,319,744 B1 * | 1/2008 | Arnold et al. | 379/201.03 |
| 2002/0196749 A1 | 12/2002 | Eyuboglu et al. | |
| 2003/0045275 A1 | 3/2003 | McDonagh et al. | |
| 2003/0100311 A1 | 5/2003 | Chung et al. | |
| 2004/0043763 A1 | 3/2004 | Minear et al. | |
| 2005/0213555 A1 | 9/2005 | Eyuboglu et al. | |
| 2005/0243749 A1 | 11/2005 | Mehrabanzad et al. | |
| 2005/0245279 A1 | 11/2005 | Mehrabanzad et al. | |
| 2006/0067422 A1 | 3/2006 | Chung | |

(Continued)

FOREIGN PATENT DOCUMENTS

| | | |
|---|---|---|
| GB | 2346716 | 8/2000 |
| WO | WO2004/040923 | 5/2004 |
| WO | WO2010/078364 | 7/2010 |
| WO | WO2010/078367 | 7/2010 |

OTHER PUBLICATIONS

International search report and written opinion from PCT application No. PCT/US2009/069737 mailed Apr. 7, 2010 (21 pages).

(Continued)

*Primary Examiner* — Ronald Eisner
(74) *Attorney, Agent, or Firm* — Fish & Richardson P.C.

(57) ABSTRACT

An access point detects a presence of a first device having a device identifier in a femtozone associated with the access point. The access point matches the device identifier with a first personal policy server identifier associated with a corresponding first personal policy profile comprising a first set of rules and retrieves the first personal policy profile corresponding to the first personal policy server identifier. The access point applies the first set of rules in the first personal policy profile.

20 Claims, 4 Drawing Sheets

(56) References Cited

U.S. PATENT DOCUMENTS

| | | |
|---|---|---|
| 2006/0067451 A1 | 3/2006 | Pollman et al. |
| 2006/0126509 A1 | 6/2006 | Abi-Nassif et al. |
| 2006/0159045 A1 | 7/2006 | Ananthaiyer et al. |
| 2006/0240782 A1 | 10/2006 | Pollman et al. |
| 2006/0291420 A1 | 12/2006 | Ng |
| 2006/0294241 A1 | 12/2006 | Cherian et al. |
| 2007/0001852 A1 | 1/2007 | Jalkanen et al. |
| 2007/0026884 A1 | 2/2007 | Rao |
| 2007/0054668 A1 | 3/2007 | Scheinert et al. |
| 2007/0058628 A1 | 3/2007 | Palnati et al. |
| 2007/0077948 A1 | 4/2007 | Sharma et al. |
| 2007/0097916 A1 | 5/2007 | Eyuboglu et al. |
| 2007/0115896 A1 | 5/2007 | To et al. |
| 2007/0140172 A1 | 6/2007 | Garg et al. |
| 2007/0140184 A1 | 6/2007 | Garg et al. |
| 2007/0140185 A1 | 6/2007 | Garg et al. |
| 2007/0140218 A1 | 6/2007 | Nair et al. |
| 2007/0155329 A1 | 7/2007 | Mehrabanzad et al. |
| 2007/0183427 A1 | 8/2007 | Nylander et al. |
| 2007/0208937 A1* | 9/2007 | Cam-Winget et al. ........ 713/168 |
| 2007/0220573 A1* | 9/2007 | Chiussi et al. ................ 725/114 |
| 2007/0230419 A1 | 10/2007 | Raman et al. |
| 2007/0238442 A1 | 10/2007 | Mate et al. |
| 2007/0238476 A1 | 10/2007 | Raman et al. |
| 2007/0242648 A1 | 10/2007 | Garg et al. |
| 2007/0248042 A1 | 10/2007 | Harikumar et al. |
| 2008/0003988 A1 | 1/2008 | Richardson |
| 2008/0013488 A1 | 1/2008 | Garg et al. |
| 2008/0043689 A1 | 2/2008 | Walter |
| 2008/0062925 A1 | 3/2008 | Mate et al. |
| 2008/0065752 A1 | 3/2008 | Ch'ng et al. |
| 2008/0069020 A1 | 3/2008 | Richardson |
| 2008/0069028 A1 | 3/2008 | Richardson |
| 2008/0076398 A1 | 3/2008 | Mate et al. |
| 2008/0076412 A1 | 3/2008 | Khetawat et al. |
| 2008/0117842 A1 | 5/2008 | Rao |
| 2008/0119172 A1 | 5/2008 | Rao et al. |
| 2008/0120417 A1 | 5/2008 | Harikumar et al. |
| 2008/0139203 A1 | 6/2008 | Ng et al. |
| 2008/0146232 A1 | 6/2008 | Knisely |
| 2008/0151843 A1 | 6/2008 | Valmikam et al. |
| 2008/0159236 A1 | 7/2008 | Ch'ng et al. |
| 2008/0162924 A1 | 7/2008 | Chinitz et al. |
| 2008/0162926 A1 | 7/2008 | Xiong et al. |
| 2008/0207182 A1* | 8/2008 | Maharajh et al. .......... 455/414.1 |
| 2008/0214161 A1* | 9/2008 | Jakl ............................. 455/414.2 |
| 2009/0011738 A1* | 1/2009 | Sasakura ....................... 455/410 |
| 2009/0221278 A1* | 9/2009 | Spelta et al. .................. 455/418 |
| 2009/0288152 A1* | 11/2009 | Huber et al. ....................... 726/6 |
| 2009/0298470 A1* | 12/2009 | Huber et al. .................. 455/411 |
| 2010/0167694 A1 | 7/2010 | Chiussi et al. |
| 2010/0167718 A1 | 7/2010 | Chiussi et al. |
| 2011/0009113 A1 | 1/2011 | Vikberg et al. |

OTHER PUBLICATIONS

International search report and written opinion from PCT application No. PCT/US2009/069734 mailed Mar. 18, 2010 (20 pages).

$3^{rd}$ Generation Partnership Project "3GPP2", "cdma2000 High Rate Packet Data Air Interface Specification", C.S0024, version 4.0, Oct. 25, 2002 (548 pages).

3rd Generation Partnership Project "3GPP2", "cdma2000 High Rate Packet Data Air Interface Specification", C.S0024-A, version 1.0, Mar. 2004 (1083 pages).

3rd Generation Partnership Project "3GPP2", "cdma2000 High Rate Data Air Interface Specification", C.S0024-A, version 2.0, Jul. 2005 (1227 pages).

3rd Generation Partnership Project "3GPP2", "cdma2000 High Rate Data Air Interface Specification", C.S0024-B, version 1.0, Apr. 2006 (1623 pages).

3rd Generation Partnership Project "3GPP2", "cdma2000 High Rate Data Air Interface Specification", C.S0024-B, version 2.0, Mar. 2007 (1627 pages).

USPTO Non-Final Office Action in U.S. Appl. No. 12/347,201, dated Apr. 29, 2011, 18 pages.

USPTO Non-Final Office Action in U.S. Appl. No. 12/347,201, dated Oct. 31, 2011, 21 pages.

Fish and Richardson, P.C., Amendment in Reply to Action dated Apr. 29, 2011 in U.S. Appl. No. 12/347,201, filed Jul. 29, 2011, 14 pages.

International Preliminary Report on Patentability from PCT application No. PCT/US2009/069737 mailed Jul. 14, 2011 (9 pages).

International Preliminary Report on Patentability from PCT application No. PCT/US2009/069734 mailed Jul. 14, 2011 (9 pages).

Fish and Richardson, P.C., Amendment in Reply to Action dated Apr. 16, 2012 in U.S. Appl. No. 12/347,201, filed Jul. 16, 2012, 13 pages.

Fish and Richardson, P.C., Amendment in Reply to Action dated Oct. 31, 2011 in U.S. Appl. No. 12/347,201, filed Feb. 29, 2012, 12 pages.

USPTO Final Office Action in U.S. Appl. No. 12/347,201, dated Mar. 16, 2012, 21 pages.

* cited by examiner

FEMTO PERSONAL POLICY SERVER

CROSS-REFERENCE TO RELATED APPLICATION

This patent application relates to U.S. application Ser. No. 12/347,201, entitled "Femto Personal Proxy Application Client" and filed concurrently herewith. The contents of U.S. application Ser. No. 12/347,201, entitled "Femto Personal Proxy Application Client" are hereby incorporated by reference into this application as if set forth herein in full, and may be combined with any of the features described herein.

TECHNICAL FIELD

This description relates to access terminal authorization at private access points in wireless networks.

BACKGROUND

Cellular wireless communications systems, for example, are designed to serve multiple wireless-enabled devices distributed over a large geographic area by dividing the area into regions called "cells" or "cell areas". At or near the center of each cell area, a network-side access device (e.g., an access point or base station) is located to serve client devices located in the cell area and is commonly referred to as an "access terminal". Examples of access terminals include wireless-enabled devices such as cellular telephones, laptops, personal digital assistants (PDAs), and/or other user equipment (e.g., mobile devices). An access terminal generally establishes a call, also referred to as a "communication session," with an access point to communicate with other entities (e.g., servers) in the network.

SUMMARY

In an aspect, an access point detects a presence of a first device having a device identifier in a femtozone associated with the access point. The access point matches the device identifier with a first personal policy server identifier associated with a corresponding first personal policy profile comprising a first set of rules, and retrieves the first personal policy profile corresponding to the first personal policy server identifier. The access point applies the first set of rules in the first personal policy profile.

The access point may deactivate the first predefined set of rules in the first personal policy profile when the presence of the first device is not detected.

The access point may also match the device identifier associated with the first device with an identifier associated with a corresponding second personal policy profile that comprises a second predefined set of rules when the presence of the first device is not detected. The access point may retrieve the second personal policy profile using the second personal policy server identifier and apply the second predefined set of rules in the second personal policy.

Implementations may include one or more of the following.

The first device may include a handset.

The first set of rules in the first personal policy profile may include a first set of parameters and values associated with the parameters, wherein the first set of parameters has at least a first parameter and a second parameter, the first parameter corresponding to first set of applications and the second parameter being a second device identifier, the second device identifier identifying one device selected from a group comprising the first device, a second device attached to a home network associated with the access point, and a network server communicating with the access point, the identified device being the device where the set of application runs.

The first set of rules in the first personal policy profile may include changing values of usage flags associated with the software applications in the first set of applications from the "on" state to an "off" state. The first set of rules in the first personal policy profile may also include a second set of parameters and values associated with the second set of parameters, wherein the second set of parameters may include parameters to change the user preference associated with the software applications in the first set of applications. The second set of parameters may also include priorities and traffic descriptors to apply to traffic generated by the first device as the traffic is processed in the access point. The second set of parameters may also include a description of a digital right management that is applied to traffic generated by the first device.

The first set of rules in the first personal policy profile may also include a set of routes of digital data communications that are made available in the access point to traffic generated by the first device.

In an aspect, a method comprises steps as outlined above.

In another aspect, a computer program product, tangibly embodied in a computer readable medium, is operable to cause a data processing apparatus to perform operations comprising the steps of the method above.

In yet another aspect, an apparatus can be configured to perform the steps outlined above.

DESCRIPTION OF DRAWINGS

Like reference symbols in the various drawings indicate like elements.

DETAILED DESCRIPTION

In wireless communication networks generally, geographic areas served by access points, also referred to as "service areas," may vary in size, may include smaller service areas, and/or may be located within larger service areas. Larger geographic areas that include one or more smaller service areas are referred to as "macrocell areas," and an access point that serves a macrocell area is referred to as a "macrocell." Within a macrocell area, one or more access points may be located to serve smaller geographic areas, referred to as "femtocell areas", or "femtozones." An access point that serves a femtozone is referred to as a "femtocell access point." A macrocell, for example, may provide coverage to an area of a few blocks, while a femtocell access point may provide coverage to an area spanning a floor of a building, a house, or an office space.

Global System for Mobile communications/Wideband Code Division Multiple Access (GSM/WCDMA) wireless communication networks (e.g., 2G/3G macro networks) have been implemented and are in operation globally. However, one motivation for providing "femtocell access points" in such 2G/3G macro networks is that the coverage of those macro networks is often poor indoors, which may cause, e.g., service disruption (e.g., a dropped telephone call) to users of devices at home and inside buildings. Femtocell access points, also known as, e.g., "home" base stations, private access points, or simply "femtocells", provide complementary indoor coverage to 2G/3G macro networks for service continuity. Femtocell access point (FAP) implementations may also serve as a new service platform to enable mobile wireless broadband applications and home entertainment.

A private access point may include, for example, a femtocell access point or a picocell access point. A private access point may be installed anywhere, for example, a home, an office, a public space, or a restaurant. For ease of description, private access points will be described hereinafter as femtocell access points or FAPs.

Figure 1:
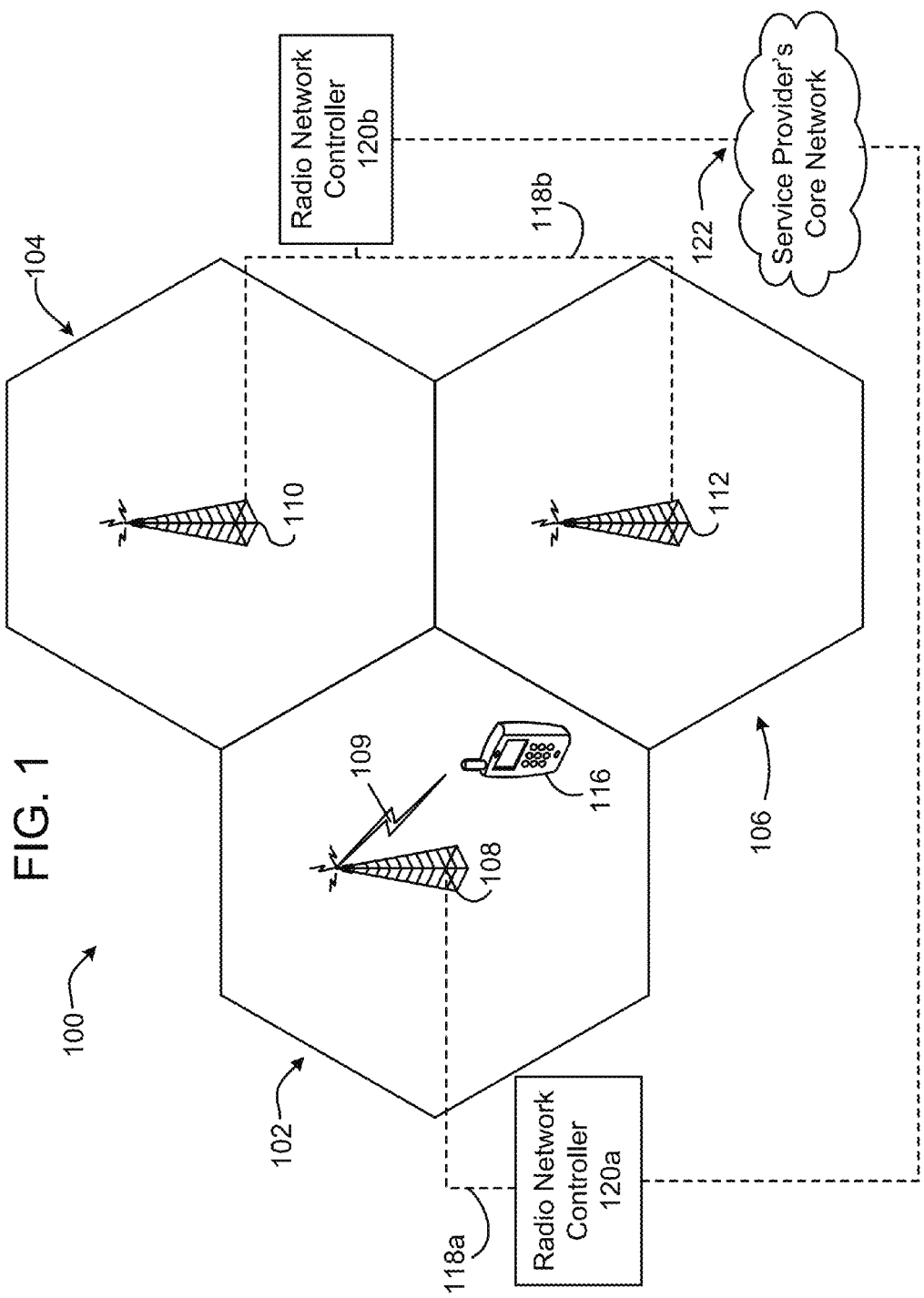
FIG. 1 is a diagram illustrating a wireless network.

Referring to FIG. 1, a radio access network (RAN) 100 includes multiple macro access points or "macrocells" 108, 110, and 112 located in macrocell areas 102, 104, and 106, respectively. The macrocell areas 102, 104, and 106 can include one or more femtocell access points (FAPs). The macrocells 108, 110, and 112 are each configured to communicate with a device over an airlink. For example, macrocell 108 communicates with device 116 over an airlink 109. Macrocells 108, 110, and 112 are connected over a backhaul connection (e.g., backhaul connection 118a or 118b) to a radio network controller (RNC) which in turn communicates with the service provider's core network 122, e.g., via RNC 120a or 120b, which may be one or more physical devices at different locations.

The RAN 100 is configured to support various mobile wireless access technologies, examples of which include Universal Mobile Telecommunications System (UMTS) and Code Division Multiple Access (CDMA) 2000. The 1xEV-DO protocol has been standardized by the Telecommunication Industry Association (TIA) as TIA/ELA/IS-856, "CDMA2000 High Rate Packet Data Air Interface Specification," 3GPP2 C.S0024-0, Version 4.0, Oct. 25, 2002, which is incorporated herein by reference. Revision A to this specification has been published as TIA/EIA/IS-856A, "CDMA2000 High Rate Packet Data Air Interface Specification," 3GPP2 C.S0024-A, Version 2.0, July 2005. Revision A is also incorporated herein by reference. Revision B to this specification has been published as TIA/EIA/IS-856-B, 3GPP2 C.S0024-B and is also incorporated herein by reference. Other wireless communication standards may also be used. Although this description uses terminology from the 3GPP's UMTS standards, the same concepts are applicable to other wireless communication standards, including CDMA 1xEV-DO, CDMA2000, WiMax, WiBro, WiFi, and the like.

The following sections of the 3GPP Standard are hereby incorporated by reference in their entirety:

3GPP Technical Specification 25.331 version 8.3.0 Release 8, 2008-07, Universal Mobile Telecommunications System (UMTS); Radio Resource Control (RRC); Protocol specification;

3GPP Technical Specification 25.304 version 7.6.0 Release 7, 2008-07, Universal Mobile Telecommunications System (UMTS); User Equipment (UE) procedures in idle mode and procedures for cell reselection in connected mode;

3GPP Technical Specification 25.133 version 8.3.0 Release 8, 2008-06, Universal Mobile Telecommunications System (UMTS); Requirements for support of radio resource management (FDD);

3GPP Technical Specification 24.008 version 7.9.0 Release 7, 2007-10, Digital cellular telecommunications system (Phase 2+); Universal Mobile Telecommunications System (UMTS); Mobile radio interface Layer 3 specification; Core network protocols; Stage 3; and 3GPP Technical Specification 23.122 version 7.9.0 Release 7, 2007-06, Digital cellular telecommunications system (Phase 2+); Universal Mobile Telecommunications System (UMTS); Non-Access-Stratus (NAS) functions related to Mobile Station (MS) in idle mode.

Figure 2:
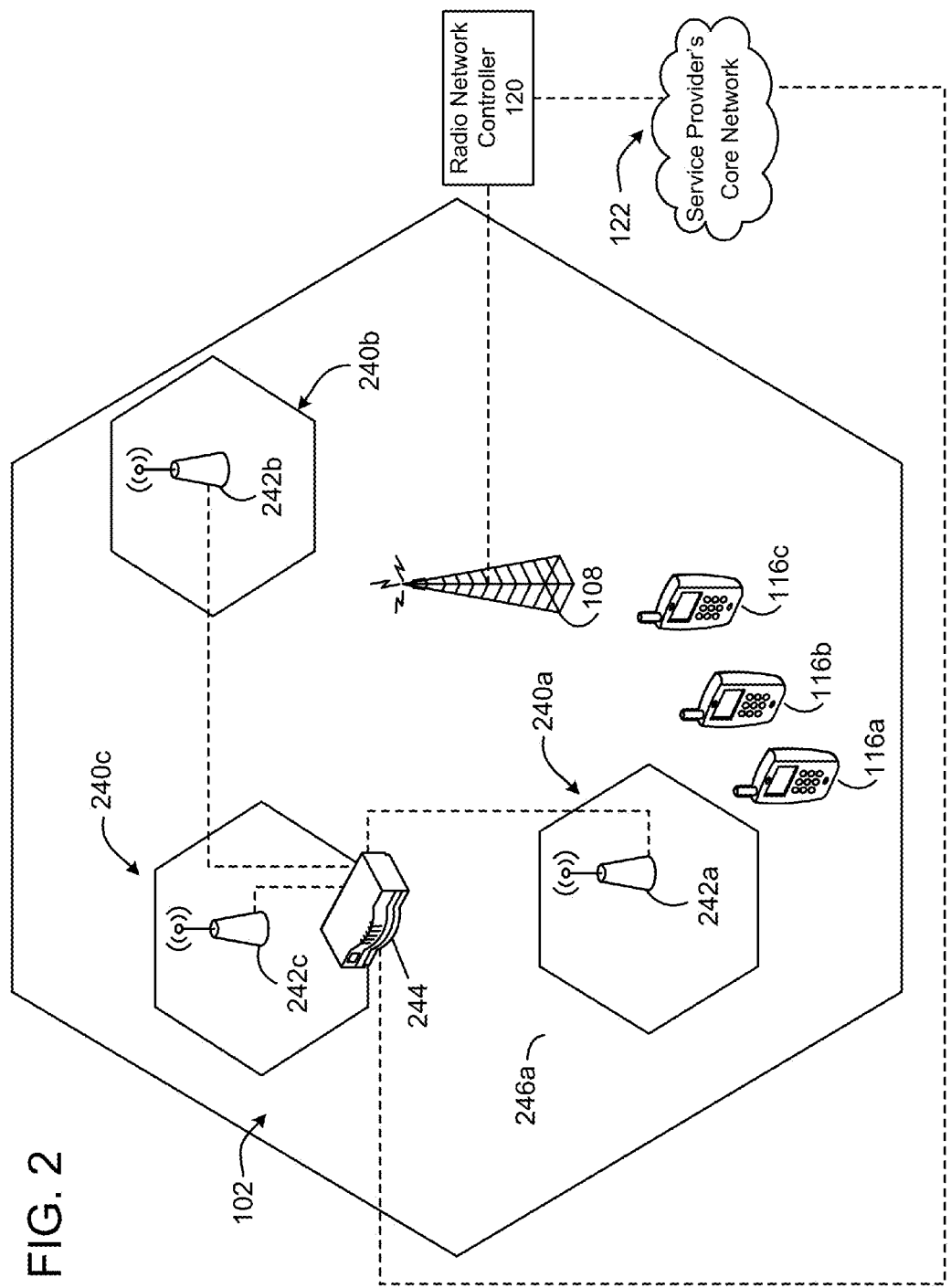
FIG. 2 is a diagram illustrating a wireless network with a home networking deployment.

FIG. 2 shows a femtocell deployment in the macrocell service area 102 of the RAN 100 of FIG. 1. The service area 102 of macrocell 108 includes femtocell areas 240a, 240b, and 240c served by femtocell access points (FAPs) 242a, 242b, and 242c, respectively. Hereinafter, the femtocell access points 242a, 242b, and 242c are referred to as "FAPs 242a, 242b, and 242c." Although, only three FAPs are shown in FIG. 2, in practice a macrocell area can include many more FAPs. For example, a macrocell area could include hundreds, thousands, or hundreds of thousands of FAPs.

A femtocell server 244 is in communication with one or more of the FAPs 242a-c. The femtocell server 244 maintains active associations between devices such as devices 116a, 116b, and 116c and the FAPs 242a-c so that a hand-in request from the macrocell 108 (or other components of the mobile core network) can be directed to the correct FAP. One or more of the FAPs 242a-c and the femtocell server 244 may be combined as a single device. In early deployment, the femtocell server 244 may present a similar, conventional system interface as that of RNC 120 to the existing core network infrastructure 122. References to the core network 122 may in some cases be a shorthand for a reference to the femtocell server 244, and in some implementations, certain functions of the core network 122 may be included in the femtocell server 244 and vice versa. For example, when reference is made to a FAP accessing stored information from the core network 122, all or part of the information might be stored on the core network 122 and/or the femtocell server 244.

Femtocell access point systems typically perform some type of closed access control. Closed access control means, e.g., that access to each femtocell access point is limited in some fashion, i.e., not every device may "camp" on the femtocell and/or utilize the services of the femtocell. For example, an owner of a FAP may like to control which devices are allowed to camp on and register with the core network 122 via the FAP to use normal service (e.g., non-emergency service).

Devices may be "authorized" or "not authorized" ("unauthorized") to camp on and/or use services of a FAP. Each FAP of the FAPs 242a-c may include an authorization list, or "access control list", which may be stored in memory on the FAP. See, e.g., access control lists (ACLs) stored on respective FAPs 242a, 242b, 242c in FIG. 2. The access control list for a particular FAP includes identities of devices that are authorized on that FAP. Devices that are not identified on the access control list of a particular FAP are not authorized on that FAP. A particular device may be authorized on one FAP and unauthorized on another FAP. From the perspective of a FAP, a device is either an authorized device or an unauthorized device. From the perspective of a device, a FAP is either an authorized FAP (e.g., a "home" FAP that the device is authorized on), or an unauthorized FAP (e.g., a "foreign" FAP that the device is not authorized on). A "home" FAP need not be located in a user's home and may, e.g., be located in an office building, or a public place. Likewise, a "foreign" FAP may be located, e.g., in close physical proximity to a user's "home" FAP but still be "foreign" from the perspective of the device. Just as a FAP may identify more than one authorized device in its access control list, a device may be authorized on more than one FAP (and thus may have more than one authorized FAP or "home" FAP). Hereafter, for ease of description, a home FAP for an access terminal will be referred to as though it is the only home FAP for the access terminal. Access control lists may be updated periodically by, e.g., an administrator or operator of the core network, e.g., the core network 122. Access control lists may also be built dynamically and loaded to the FAP by, e.g., an administrator or operator of the core network, e.g., the core network 122.

In, e.g., a wireless network such as a UMTS network, each access point is assigned an access point identifier such as a Location Area Identifier. Location Area Identifiers are explained in more detail in, e.g., 3GPP Technical Specification 23.003, section 4.4.4.6. The Location Area Identifier (LAI) of the access point is broadcast to devices. When camping on an access point, the device issues a Location Area Update Request message that contains the LAI assigned to that access point. That Location Area Update Request message is forwarded by the access point to the core network and the core network returns a message to the device that, e.g., allows that device to camp on the access point to use normal service (e.g., non-emergency service) or that rejects the device's Location Area Update Request to disable normal service (e.g., unless the device is trying to make an emergency call from the FAP). Once camped on an access point with a particular LAI, the device can move into the coverage area of another access point with the same LAI without issuing a new Location Area Update Request. The device issues a new Location Area Update Request message when the device moves into the coverage area of an access point with a different LAI. The device may also issue the Location Area Update Request periodically to inform an access point that the device is still in the vicinity of the access point.

A LAI is an example of an access point identifier. In wireless networks that use other air interface standards, an access point identifier other than a LAI may be used in, e.g., access control.

When a device moves into the coverage area of a FAP, the device will generally issue a Location Area Update Request message containing the LAI assigned to that FAP. Thus, even a device that is unauthorized on a particular FAP but that is in range of or in the coverage area of the FAP will generally attempt to camp on the FAP and perform Location Area registration with the core network (e.g., core network 122) using the Location Area Update Request message. In order to support a form of closed access control, Location Area Update Request messages from unauthorized devices should be rejected to prevent the unauthorized devices from camping on the FAP to use normal service. If Location Area Update requests from unauthorized devices are not rejected by the FAP in some fashion, then unauthorized devices that remain in range of the FAP will generally keep retrying the Location Area Update Requests, which drains the battery and shortens the battery life of the devices. Other issues may arise when Location Area Update requests from unauthorized devices are not properly rejected. In a situation in which a FAP is surrounded by unauthorized devices, for example in a crowded area, the FAP may become overloaded in handling Location Area Update requests. If the FAP passes messages from devices to the core network without first confirming that the devices originating the messages are authorized on the FAP, then, due to the potential volume of requests from unauthorized devices, excessive messaging traffic between the FAP and the core network may become an issue. On the other hand, it is possible for a FAP to reject an unauthorized device completely, or effectively completely. However, since some core network operators consider it desirable for any device, even an unauthorized device, to make emergency calls using a FAP, such rejection methods that block unauthorized devices from making even emergency calls may be undesirable.

Figure 3:
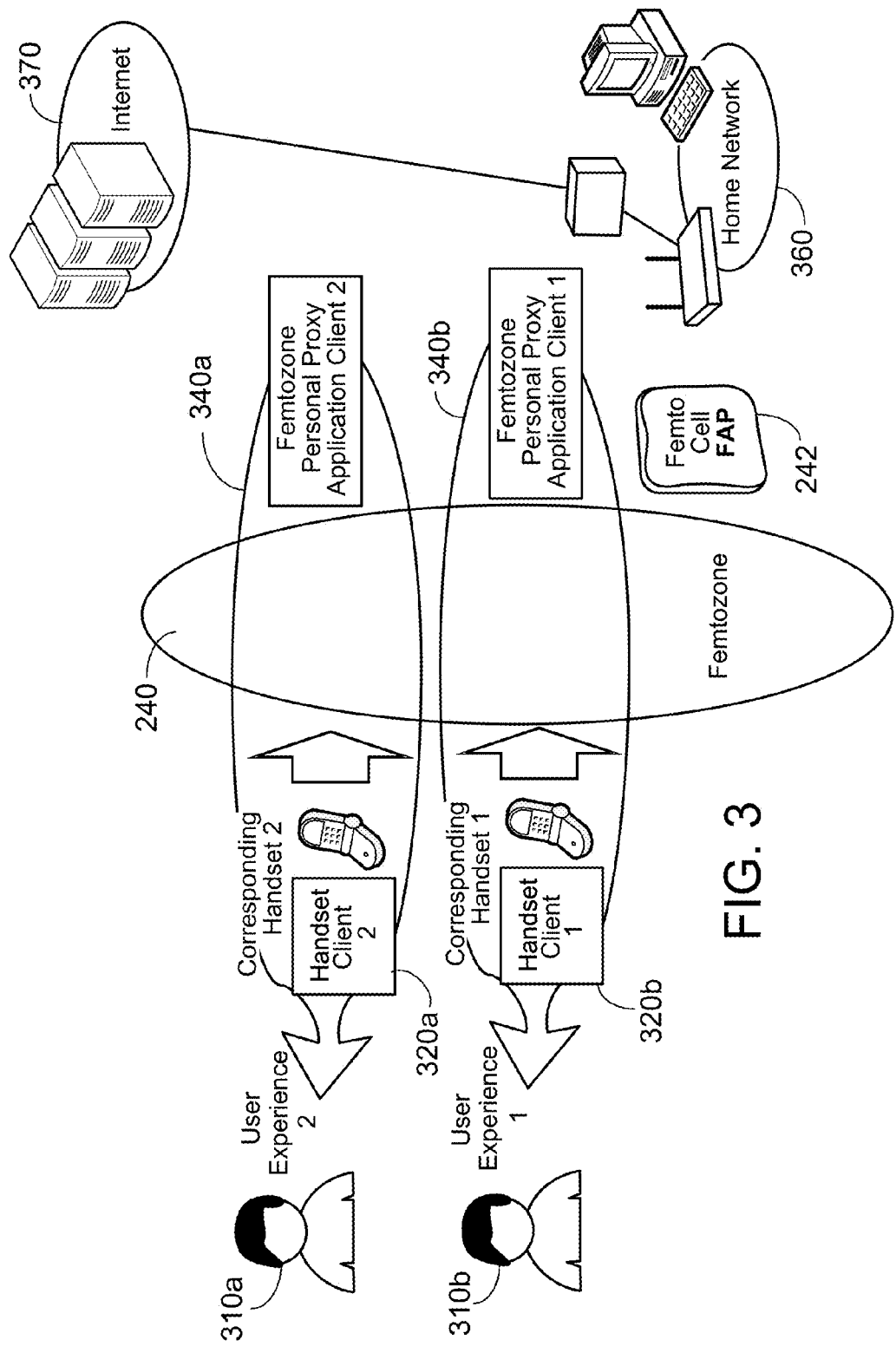
FIG. 3 is a diagram illustrating a personal proxy application client for a femtocell.

Referring to FIG. 3, a FAP 242 is configured to detect the presence of devices 320a and 320b, for example, handsets, that enter femtozone 240. Based on a device identifier associated with a device, say 320a, FAP 242, upon detection of and verification that the device 320a may camp on the FAP 242, may make available a set of applications to run on the device 320a. The set of applications are particular to that device through personal proxy client 340a. FAP 242 may also detect and verify permission to camp for device 320b and make available a set of applications for device 320b through personal proxy client 320b.

A device 320 (which may represent device 320a or device 320b in FIG. 3) has associated with it a unique device identifier with which the FAP 242 is able to identify the device. Examples of device identifiers that may be used in an access control list on a particular FAP may include the International Mobile Subscriber Identity (IMSI) of the device. While the device may also use a temporary identifier such as a Temporary Mobile Subscriber Identity (TMSI) in initial communications with a FAP, access control lists may generally include the unique IMSI of the device rather than the TMSI.

Detection of the device begins when the device enters the femtozone associated with FAP 242 and broadcasts its device identifier via a signal. The FAP 242 then receives the signal containing the device identifier with a built-in receiver. Once the device identifier is retrieved from the signal using a processor in the FAP 242, the device is considered detected by the FAP 242.

The detected device has its device identifier located on the access control list as described above. Assuming the device is authorized to camp on the FAP 242, the device identifier is then matched with an identifier in the personal proxy client ("PPC identifier") in order to identify applications that are to be run on the device 320 or on the FAP 242, a device attached to the home network 360, or a server attached to the Internet 370 and associated with the device identifier. A database of PPC identifiers and pointers to applications corresponding to each PPC identifier may be kept in a location accessible to the FAP 242. Such a database may be separate from the access control list, but it may be incorporated into the access control list and therefore stored in memory in the FAP as well.

Matching the device identifier with a PPC identifier may be accomplished, for example, through looking up the PPC identifier in a database. Such a looking up may be done using a standard pattern-matching algoritlun.

As stated above, a PPC identifier is associated with pointers to applications that may be run on the device 320, FAP 242. a device attached to home network 360, or on a server attached to the Internet 370. Once the device identifier is matched with a PPC identifier, the device identifier is associated with the pointers to the applications. The pointers may comprise, e.g., IP addresses denoting locations where the corresponding applications are stored. The locations may be directly accessible by the FAP 242.

The FAP 242 may access the applications now associated with the device identifier via the associated pointers. Typical applications may include a single sign-on application, a personal automated teller application, and an automatic network backup application. The applications may be run on FAP 242, device 320, other devices connected to the FAP 242, e.g., a device attached to the home network 360, or a server attached to the Internet 370. For example, if a pointer contains the IP address of a storage location of an application, then a message may be sent from the FAP 242 to the storage location to download the application to the device 320 via the FAP 242. An application may also be stored on, for example, the FAP 242, or a femto server 244. At least some of the applications may already be present on device 320; in that case, such applications need not be loaded onto the device. An application may also be loaded to a device attached to the home network 360 or a server attached to the Internet 370.

Once the applications are loaded onto device 320, FAP 242, a device attached to home network 360, or to a server attached to the Internet 370, they are activated by the FAP 242. Each application may have a usage flag associated with device 320. A usage flag has two states: "on" and "off". An application may be activated on the device if its usage flag associated with the device is in the "on" state. By default, a usage flag is in the "off" state. If the device 320 has been detected and authorized, and an associated application has been loaded by the FAP 242, then the usage flag for that application is switched to the "on" state. Typically, the usage flag stays in the "on" state while the device 320 is camped on the FAP 242.

If the device 320 departs from the femtozone associated with FAP 242 or is no longer detected by the FAP 242, then the applications loaded onto the device 320, FAP 242, a device attached to home network 360, or to a server attached to the Internet 370, may be deactivated. The deactivation may occur by a switching of the usage flags of the applications loaded onto device 320, FAP 242, the device attached to the home network 360, or the server attached to the Internet 370, from "on" to "off".

Figure 4:
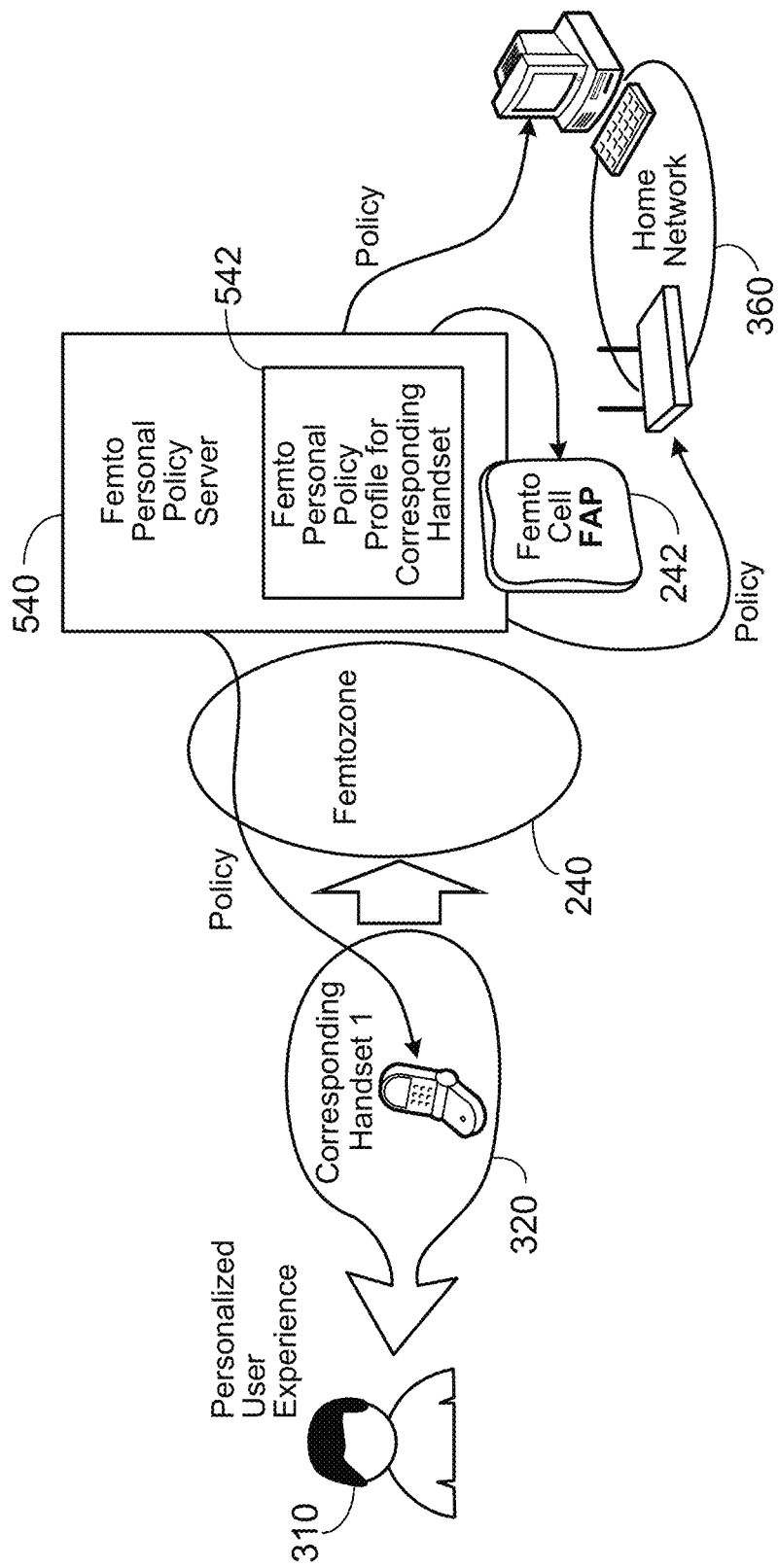
FIG. 4 is a diagram illustrating a personal policy server.

The concept of a personal application proxy client that is activated while device 320 camps on FAP 242 and is deactivated when device 320 departs from the femtozone as described above can be generalized into a personal policy server that may apply to the device 320, FAP 242, a device attached to the home network 360, or to a server attached to the Internet 370 through a FAP 242 while the device 320 camps on the FAP 242. Such a personal policy server is illustrated in FIG. 4. Femto personal policy server 540 comprises a set of Femto personal policy profiles 542 for devices that may appear on the access control list for a FAP 242. There may be a unique personal policy profile 542 for each device 320 that is allowed to camp on the FAP 242. When the device 320 attaches to the FAP 242 and is detected by the FAP 242 as described above, the detected device 320 has its device identifier located on the access control list as described above. Assuming the device is authorized to camp on the FAP 242, the device identifier is then matched with an identifier in the personal policy server ("PPS identifier") in order to identify the personal policy profile 542 that corresponds to the device 320.

Each Femto personal policy profiles 542 may take the form of a set of rules, and will be described below as such. The rules contained in a personal policy profile may be applied to the device 320, or to the FAP 242 or to a device attached to the home network 360, or to a server attached to the Internet 370, while the device 320 camps on the FAP 242.

If device 320 departs from the femtozone associated with FAP 242 or is no longer detected by FAP 242, then a first personal policy profile associated with device 320 is deactivated and the rules contained in the personal policy profile are no longer applied to the device 320, FAP 242, a device attached to home network 360, or to a server attached to the Internet 370.

In certain cases, when the personal policy profile is deactivated, a different, second personal policy profile corresponding to the device 320 is retrieved using the PPS identifier, and the rules contained in the second personal policy profile may be applied to the device 320, FAP 242, a device attached to home network 360, or to a server attached to the Internet 370, while the device 320 is not detected by the FAP 242. In this case, if the device 320 is detected again by the FAP 242, the second personal policy profile is deactivated, and the first personal policy profile to be used while the device 320 is camping on the FAP 242 is activated.

Femto personal policy server 540 containing the set of rules as described above may reside on FAP 242 or on a device closely integrated with the FAP, a device external to the FAP, e.g., femto server 244, a device connected to home network 360, or on a server connected to the Internet 370. Femto personal policy server 540 may apply its rules in the set of rules to any device associated with FAP 242, including FAP 242 itself.

The rules contained in a personal policy profile may include a wide variety of different rules. A typical example is a set of rules for changing the functionality of the device 320, FAP 242, a device attached to the home network 360, or to a server attached to the Internet 370 given ambient conditions. Ambient conditions may be a time of day, a time of year, a location (i.e. work or home), or another condition. Such conditions may be described with a set of parameters. A set of rules may also be thought of as a table of parameters and values associated with the parameters. For example, changing the functionality of the device 320, FAP 242, a device attached to the home network 360, or a server attached to the Internet 370 may involve activating applications associated with the device 320, FAP 242, a device attached to the home network 360, or a server attached to the Internet 370. Further, if there are other parameters associated with the device identifier, then further matching is done on those parameters. For example, the time of day according to FAP 242 may be matched with a value of the time parameter in the rules table. If no such parameter value exists, then a default set of applications may be activated. As described above, activating an application comprises setting a usage flag associated with the application and the associated device to an "on" state from an "off" state.

Examples of rules that may be included in a set of rules in a personal policy profile include rules that control a look and feel of the user interface on the device 320 or on a device attached to a home network 360 associated with FAP 242; for example, a rule may specify any set of applications, services, or features accessible by a user from device 320 or a device attached to home network 360, such as e.g., address books; a user preference changing application that change user preferences for applications on device 320 or on devices attached to home network 360; an application that controls accessibility settings for address books, web sites, etc. (e.g., for parental control); applications that change "personal routes" accessible in a local routing table in the FAP 242 or on a home gateway, or call routing settings in the FAP 242 or on a call routing server attached to the FAP 242; an application that manages QoS treatment in the FAP 242 or on a home gateway of different types of traffic generated by a user and/or a priority of user traffic with respect to that of other users, for different traffic types; an application that manages Digital Right Management and content sharing privileges and/or billing and charging profiles for the user using device 320 or devices attached to home network 360.

Although the techniques described above employ the UMTS air interface standard, the techniques are also applicable to other CDMA and non-CDMA air interface technologies in which, e.g., messages can be passed between access terminals and other network components.

The processes described herein are not limited to use with any particular hardware, software, or programming language; they may find applicability in any computing or processing environment and with any type of machine that is capable of running machine-readable instructions. All or part of the processes can be implemented in digital electronic circuitry, or in computer hardware, firmware, software, or in combinations thereof.

The processes described herein and their various modifications (hereinafter "the processes"), are not limited to the hardware and software described above. All or part of the processes can be implemented, at least in part, via a computer program product, e.g., a computer program tangibly embodied in an information carrier, such as one or more machine-readable storage media or in a propagated signal, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the processes can be performed by one or more programmable processing devices executing one or more computer programs to perform the functions of the processes. All or part of the processes can be implemented as, special purpose logic circuitry, e.g., an FPGA (field programmable gate array) and/or an ASIC (application-specific integrated circuit).

Processing devices suitable for the execution of a computer program include, by way of example, both general and special purpose microprocessors, and any one or more processors of any kind of digital computer. Generally, a processing device will receive instructions and data from a read-only memory or a random access memory or both. The components of a computer include one or more processing devices for executing instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

Actions associated with the processes can be rearranged and/or one or more such actions can be omitted to achieve the same, or similar, results to those described herein.

Components of different implementations may be combined to form implementations not specifically set forth above. Other implementations not specifically described are also within the scope of the following claims.

What is claimed is:

1. A method performed by an access point connected to a home network, comprising:
    detecting, by the access point, a presence of a first device having a device identifier in a femtozone associated with the access point;
    matching, by the access point, the device identifier with a first personal policy server identifier among a plurality of policy server identifiers, said first personal policy server identifier being associated with a corresponding first personal policy profile, the first personal policy profile comprising a first set of rules;
    retrieving, by the access point, the first personal policy profile corresponding to the first personal policy server identifier; and
    applying, by the access point, the first set of rules in the first personal policy profile, including a rule to change the functionality of a second device connected to the home network based on a time of day.

2. The method of claim 1, wherein the first device comprises a handset.

3. The method of claim 1, wherein the first set of rules in the first personal policy profile comprises a first set of parameters and values associated with the parameters, wherein the first set of parameters has at least a first parameter and a second parameter, the first parameter corresponding to a first set of applications and the second parameter being a second device identifier, the second device identifier identifying one device selected from a group comprising the first device, a second device attached to a home network attached to the access point, and a network server communicating with the access point, the identified device being the device where the set of application runs.

4. The method of claim 3, wherein the first set of rules in the first personal policy profile comprises a rule for changing values of usage flags associated with the software applications in the first set of applications from the "on" state to an "off" state.

5. The method of claim 3, wherein the first set of rules in the first personal policy profile comprises a second set of parameters and values associated with the second set of parameters, wherein the second set of parameters comprises parameters to change a user preference associated with software applications in the first set of applications.

6. The method of claim 3, wherein the first set of rules in the first personal policy profile comprises a second set of parameters and values associated with the second set of parameters, wherein the second set of parameters comprises priorities and traffic descriptors to apply to traffic generated by the first device as the traffic is processed in the access point.

7. The method of claim 3, wherein the first set of rules in the first personal policy profile comprises a second set of parameters and values associated with the second set of parameters, wherein the second set of parameters comprises a description of a digital right management that is applied to traffic generated by the first device.

8. The method of claim 1, wherein the first set of rules in the first personal policy profile comprises a set of routes for digital data communications that are made available in the access point to traffic generated by the first device.

9. The method of claim 1, further comprising deactivating the first predefined set of rules in the first personal policy profile when the presence of the first device is not detected.

10. The method of claim 9, further comprising:
matching the device identifier associated with the first device with an identifier associated with a corresponding second personal policy profile that comprises a second predefined set of rules when the presence of the first device is not detected;
retrieving the second personal policy profile using the second personal policy server identifier; and
applying the second predefined set of rules in the second personal policy profile.

11. One or more computer storage devices storing instructions that, when executed by one or more processing devices associated with an access point, cause the one or more processing devices to:
detect a presence of a first device having a device identifier in a femtozone associated with the access point, the access point connected to a home network;
match the device identifier with a first personal policy server identifier among a plurality of policy server identifiers, said first personal policy server identifier being associated with a corresponding first personal policy profile, the first personal policy profile comprising a first predefined set of rules;
retrieve the first personal policy profile corresponding to first personal policy server identifier; and
apply the first predefined set of rules in the first personal policy profile, including a rule to change the functionality of a second device connected to the home network based on a time of day.

12. The one or more computer storage devices of claim 11, wherein the first device comprises a handset.

13. The one or more computer storage devices of claim 11, wherein the first predefined set of rules in the first personal policy profile comprises a first set of parameters and values associated with the parameters, wherein the first set of parameters has at least a first parameter and a second parameter, the first parameter corresponding to a first set of applications and the second parameter being a second device identifier, the second device identifier identifying one device selected from a group comprising the first device, a second device associated with a home network attached to the access point, and a network server communicating with the access point, the identified device being the device where the set of application runs.

14. The one or more computer storage devices of claim 11, further storing instructions that, when executed by the one or more processing devices, cause the one or more processing devices to deactivate the first predefined set of rules in the first personal policy profile when the presence of the first device is not detected.

15. The one or more computer storage devices of claim 11, further storing instructions that, when executed by the one or more processing devices, cause the one or more processing devices to:
match the device identifier associated with the first device with an identifier associated with a corresponding second personal policy profile that comprises a second predefined set of rules when the presence of the first device is not detected;
retrieve the second personal policy profile using the second personal policy server identifier; and
apply the second predefined set of rules in the second personal policy profile.

16. An apparatus comprising:
an access point associated with a femtozone, the access point connected to a home network;
a detector configured to detect a presence of a first device having a device identifier in the femtozone associated with the access point;
a processor configured to:
match the device identifier with a first personal policy server identifier among a plurality of policy server identifiers, said first personal policy server identifier being associated with a corresponding first personal policy profile, the first personal policy profile comprising a first predefined set of rules;
retrieve the first personal policy profile corresponding to first personal policy server identifier; and
apply the first predefined set of rules in the first personal policy profile including a rule to change the functionality of a second device connected to the home network based on a time of day.

17. The apparatus of claim 16, wherein the first device comprises a handset.

18. The apparatus of claim 16, wherein the first predefined set of rules in the first personal policy profile comprises a first set of parameters and values associated with the parameters, wherein the first set of parameters has at least a first parameter and a second parameter, the first parameter corresponding to first set of applications and the second parameter being a second device identifier, the second device identifier identifying one device selected from a group comprising the first device, a second device attached to a home network associated with the access point, and a network server communicating with the access point, the identified device being the device where the set of application runs.

19. The apparatus of claim 16 wherein the processor is further configured to deactivate the first predefined set of rules in the first personal policy profile when the presence of the first device is not detected.

20. The apparatus of claim 19, wherein the processor is further configured to:
match the device identifier associated with the first device with an identifier associated with a corresponding second personal policy profile that comprises a second predefined set of rules when the presence of the first device is not detected;
retrieve the second personal policy profile using the second personal policy server identifier; and
apply the second predefined set of rules in the second personal policy profile.

\* \* \* \* \*